(12) United States Patent
Tippmann, Jr. et al.

(10) Patent No.: US 7,538,300 B1
(45) Date of Patent: May 26, 2009

(54) POLYGONAL COOKING APPARATUS WITH A PRESSURIZABLE CONDENSATE JACKET

(76) Inventors: Eugene Tippmann, Jr., 1300-D Airport Office Park North, Fort Wayne, IN (US) 46825; Lon E Lehman, 9814 Derev Ct., Fort Wayne, IN (US) 46825

( * ) Notice: Subject to any disclaimer, the term of this patent is extended or adjusted under 35 U.S.C. 154(b) by 393 days.

(21) Appl. No.: 11/480,698

(22) Filed: Jul. 3, 2006

(51) Int. Cl.
*A47J 27/06* (2006.01)
*A47J 27/026* (2006.01)
*A47J 37/10* (2006.01)

(52) U.S. Cl. ............. 219/439; 126/378.1; 126/390.1; 220/573.1; 165/104.21

(58) Field of Classification Search ............ None
See application file for complete search history.

(56) References Cited

U.S. PATENT DOCUMENTS

| | | | |
|---|---|---|---|
| 252,884 A | 1/1882 | Linney | |
| 1,493,459 A * | 5/1924 | Jancikin | 219/439 |
| 1,983,118 A | 12/1934 | Bourque | |
| 2,151,535 A * | 3/1939 | Scurlock | 126/390.1 |
| 2,279,000 A * | 4/1942 | Larson | 219/439 |
| 3,017,492 A * | 1/1962 | Jepson | 219/439 |
| 3,519,067 A * | 7/1970 | Schmidt | 165/272 |
| 3,603,767 A * | 9/1971 | Scicchitano | 219/439 |
| 3,964,378 A | 6/1976 | Dunkelman | |
| 4,629,866 A * | 12/1986 | Proctor | 219/439 |
| 4,835,369 A | 5/1989 | Oslin | |
| 5,167,216 A * | 12/1992 | Yeung et al. | 126/378.1 |
| 5,553,531 A | 9/1996 | Brown | |
| 5,611,264 A | 3/1997 | Studer | |
| 5,643,485 A * | 7/1997 | Potter et al. | 219/439 |
| 5,992,307 A | 11/1999 | Parker et al. | |
| 6,026,736 A | 2/2000 | Turner | |
| 6,191,393 B1 * | 2/2001 | Park | 219/439 |
| 6,320,166 B1 * | 11/2001 | Park | 219/439 |
| 6,965,094 B1 | 11/2005 | Friedman | |

FOREIGN PATENT DOCUMENTS

| | | |
|---|---|---|
| JP | 2001309855 | 11/2001 |
| JP | 2002263006 | 9/2002 |
| JP | 2004194694 | 7/2004 |

\* cited by examiner

*Primary Examiner*—Joseph M Pelham
(74) *Attorney, Agent, or Firm*—Michael I. Kroll

(57) ABSTRACT

A cooking apparatus having a polygonal skillet comprising a bottom plate with depending walls and an exteriorly mounted sealed jacket spaced away in communication with a heat source for heating a condensate contained within the jacket to a vapor that will circulate around the substantially planar surfaces of the skillet confined by the jacket with the jacket positioned to form a condensate return slope. The jacket and skillet have a plurality of anchoring fasteners extending therebetween providing a cooking apparatus having an enclosure capable of 400 psi, which is not in the prior art that consist substantially of radial cross section vessels of lesser pressure capability.

10 Claims, 13 Drawing Sheets

POLYGONAL COOKING APPARATUS WITH A PRESSURIZABLE CONDENSATE JACKET

BACKGROUND OF THE INVENTION

1. Field of the Invention

The present invention relates generally to cooking utensils and, more specifically, to a cooking apparatus having a polygonal receptacle comprising a skillet with a bottom plate with depending walls and an exteriorly mounted sealed jacket spaced away in communication with a heat source for heating a condensate contained within the jacket to a vapor that will circulate around the substantially planar surfaces of the polygonal receptacle confined by the jacket with the jacket positioned to form a condensate return slope. The jacket and skillet have a plurality of anchoring fasteners extending therebetween providing a cooking apparatus having an enclosure capable of 400 psi, which is not in the prior art that consist substantially of radial cross section vessels of lesser pressure capability.

The present invention provides another means of construction for gaining sufficient room for condensate within the jacket and mounting electronic heating elements within the condensate reservoir. In lieu of pins, the steam jacket contains a series of stamped risers that are affixed to the steam jacket by spot welds or other securing means.

In a third method of construction, the steam jacket contains interlocking perforated hangers affixed on each side wall to both the steam jacket and base for gaining sufficient room for condensate within the jacket and mounting electronic heating elements within the condensate reservoir

2. Description of the Prior Art

There are other vessels designed for cooking. Typical of these is U.S. Pat. No. 252,884 issued to John H. Linney on Jan. 31, 1882.

Another patent was issued to Bourque on Dec. 4, 1934 as U.S. Pat. No. 1,983,118. Yet another U.S. Pat. No. 3,964,378 was issued to Dunkelman on Jun. 22, 1976 and still yet another was issued on May 30, 1989 to Oslin as U.S. Pat. No. 4,835,369.

Another patent was issued to Brown on Sep. 10, 1996 as U.S. Pat. No. 5,553,531. Yet another U.S. Pat. No. 5,611,264 was issued to Studer on Mar. 18, 1997. Another was issued to Parker, et al. on Nov. 30, 1999 as U.S. Pat. No. 5,992,307.

Another patent was issued to Turner on Feb. 22, 2000 as U.S. Pat. No. 6,026,736. Yet another U.S. Pat. No. 6,965,094 was issued to Friedman on Nov. 15, 2005. Another was issued to Yoshio on Nov. 6, 2001 as U.S. Patent No. JP2001309855 and still yet another was issued on Sep. 17, 2002 to Koichi, et al. as U.S. Patent No. JP2002263006.

U.S. Pat. No. 252,884

Inventor: John H. Linney

Issued: Jan. 31, 1882

In a steam cooking apparatus composed of the sections A, fitted one above another, and supported above a boiler, B, and having one or more pipes, C, extending to the upper section, with openings 1), valves E, and stems F, as shown, the small holes 1 at the floor-level to carry off the water of condensation, substantially as herein described.

U.S. Pat. No. 1,983,118

Inventor: Philip Bourque

Issued: Dec. 4, 1934

In combination, an outer cup-shaped receptacle; an outwardly projecting peripheral flange on the open end of said receptacle; an inner cup-shaped receptacle adapted for engaging throughout the major portion of its body within said outer receptacle and in spaced relation thereto, the open end of said inner receptacle terminating with the same outside diameter as said outer receptacle; and an outwardly projecting peripheral flange on said inner receptacle adapted for overlying and engaging the flange on said outer receptacle.

U.S. Pat. No. 3,964,378

Inventor: Robert L. Dunkelman

Issued: Jun. 22, 1976

A frypan cooking system is provided with a tilting mechanism to rotate the frypan forward and pour cooking fluid or cleaning water through a pouring lip on the frypan rim. A drain pan is removably mounted in front of the frypan in a fixed position beneath the edge of the pouring lip as a surge reservoir to receive the discharged liquid. The pivotal axis of the frypan is positioned in front of the frypan near the front rim and in alignment with the outer edge of the pouring lip so that the lip is maintained in a position overlapping the edge of the drain pan as the frypan is rotated. The drain pan has an outlet in the bottom connected to a swivel spout for directing the discharged liquid to an external reservoir or to a floor drain through extension tubing. An alternate embodiment includes a telescoping drain chute which can be extended to substantially encompass the end of the pouring lip and direct discharged liquid to a surge reservoir which in turn outlets the liquid to a floor drain.

U.S. Pat. No. 4,835,369

Inventor: G. Robert Oslin

Issued: May 30, 1989

A jacketed kettle on a trunnion mount is tiltable for pouring a contained liquid. The inside of the kettle has a central substantially cylindrical portion that permits an agitator to be driven from the underside of the kettle while making a liquid seal above the contained liquid surface. The jacket may contain water which is heated by an immersed thermostatically controlled electric heater. A sight glass mounted into the outside of the kettle provides a visual indication of the water level in the jacket. Continuation of the outside of the kettle below the jacket provides a covered enclosure for a motor that drives the agitator by means of a gear drive unit, and for necessary electrical connectors. A symmetric agitator provides for wiping at or near the kettle inside surface and the surface of the central cylindrical portion of the kettle, and for mixing liquid within the kettle. The kettle is balanced for tipping by a lever and for return to the vertical position upon release of the lever. In an alternate embodiment, a symmetrical agitator provides scraping contact with the inside surface of the kettle.

U.S. Pat. No. 5,553,531

Inventor: Charles A. Brown

Issued: Sep. 10, 1996

A multi-functional cooking device that combines a steamer, skillet, griddle, fryer, kettle and oven into a single unit. The cooking device has a hollow base and a hollow lid. The base and the lid mate to provide an enclosed space for heating food. Heating means are associated with the base, to heat the interior space. Means are provided for lifting the lid relative to the base, and for maintaining the lid at a set position relative to the base. The base is adapted to receive water, so that when it is heated, steam will be formed in the space enclosed by the lid and base. The lower edge of the lid is recessed, and receives in the recess the upper edge of the base, whereby the mating of the two edges provides a junction to maintain steam within the space formed by the lid and base. A mechanism is provided for tilting the base at a predetermined angle, to facilitate the use of the base for grilling or frying foods.

U.S. Pat. No. 5,611,264

Inventor: Loye E. Studer

Issued: Mar. 18, 1997

A cooking apparatus for alternately cooking, broiling, or grilling foods in a single vessel. The apparatus includes a lower pan portion which is supported by a lower frame portion. An upper frame portion is pivotally supported from the lower pan portion. An upper lid portion is provided, wherein the lid portion is pivotally affixed to the upper frame portion. The lid portion includes a top portion and a grille portion. The grille portion of the lid is the inner wall surface of the top portion, and is thus located in the upper reaches of the lid portion when the lid portion is in a cooking position. When the lid is rotated one hundred eighty (180) degrees, the grille portion provides an upwardly exposed grille surface for food preparation. The lid portion is shaped suitable for nesting in the bottom portion when the upper frame portion is returned to a normal cooking position. The dutch oven type cook system has heating fluid in the passageways between the double walls and cooks from the sides, top, and bottom with hot oil. Alternately, all or a portion of the unit may be heated electrically. A bottom draw off is provided to allow cryovac chill of the pan contents.

U.S. Pat. No. 5,992,307

Inventor: Robert A. Parker, et al.

Issued: Nov. 30, 1999

A portable outdoor steamer system comprising a hollow container with an open top and a closed generally inverted dome-shaped bottom with a cover in a dome-shaped configuration. The steamer also contains a hollow support with a circular upper end secured to the lower surface of the bottom of the container. Also provided are heating components including a burner secured in the upper extent of the support on a circular plate, a hook-up mounted externally on the base and operatively coupled to the burner and a heat control dial mounted externally of the housing on a control panel operatively coupled to the burner with air holes through the base above the plate and a door formed in the housing to provide access to the burner. Air ports extend through the container in a central extent thereof with at least one food supporting rack removably secured within the container on short radial fingers above the ports, the region of the container beneath the ports for retaining water to be heated and converted into steam for cooking food supported thereabove on the racks.

U.S. Pat. No. 6,026,736

Inventor: Darrly Eric Turner

Issued: Feb. 22, 2000

A grill has top and bottom cooking surfaces with the top surface movable upward to load the grill and movable downward onto the food and bottom surface to cook the food. Different cooking surface zones may be heated individually to accommodate the amount and type of food. The top surface is lowered and pressed onto the food at about 140 psi to provide positive contact with the food. The cooking surfaces have grooves through which vapor from a heated marinade cup is channeled to steam the food and drain fat for removal. The marinade vapor replaces fat and natural juices producing a relatively low fat, moist cooked meat.

U.S. Pat. No. 6,965,094

Inventor: Nital Friedman

Issued: Nov. 15, 2005

An automatically operated steamer for cooking and warming food products is described. The steamer uses three operating thermostatic controls, a housing with a reservoir in the bottom thereof, and an electrical heat source disposed below said reservoir to heat the same. When cold water is admitted to the reservoir a thermostat closes to generate heat to warm the water and as the water warms, the flow of the water into the reservoir ceases. When the reservoir water reaches a temperature slightly above its boiling point, a second thermostat operates to control the temperature to keep the water boiling until it completely evaporates. When the water evaporates the heat within the device steamer increases, and another thermostat opens at a predetermined elevated temperature to signal for the addition of water to the reservoir. Still another thermostat operates to control the heat generated within said reservoir and steamer at a predetermined level to maintain a heated condition for food being cooked or held, and yet another safety thermostat opens in response to a predetermined elevated temperature to de-energize the electrical heater below the reservoir.

Japan Patent Number 2001309855

Inventor: Hattori Yoshio

Issued: Nov. 6, 2001

PROBLEM TO BE SOLVED: To provide a steam heating type cooker which is simply structured with less complicated drive systems. SOLUTION: A cooker body 100 is rotatively supported, on footing boxes 20 and 30, with supporting shafts 21 and 31. The supporting shaft 21 is provided with a rotary arm 23 that rotates together with the body 100. The end of the arm is connected with a piston rod 63 in a steam tilting system 60, and a steam supply pipe 131, to feed steam to a steam heating pot 130 from a steam supply source, branches off in a steam control system 40 and connects to a steam cylinder 61. The steam control system 40 drives the inner pot 120 to a tilt position or a horizontal position by controlling the steam supply to the steam cylinder 61. Since the same steam supply pipe 131 is used for both cooking and tilting the pot, the drive systems of the cooker body 100, including the piping system, are simplified.

Japan Patent Number JP2002263006

Inventor: Hosoi Koichi, et al.

Issued: Sep. 17, 2002

PROBLEM TO BE SOLVED: To provide a cooker that can circulate cleaned and deodorized fresh and clean steam for use in cooking, discharge surplus steam and cook delicious grilled food. SOLUTION: The cooker has a heating section 22 heating a thing to be cooked in a grill chamber 21, an openable door portion 23, an exhaust path 24 exhausting smoke or the like produced in the grill chamber 21 and in which a catalyst 25 is arranged, and by connecting the outlet 27 of the exhaust path to the interior of the grill chamber 21, and providing an exhaust cylinder 26 guiding the exhaust to the outside above the exhaust path 24, cleaned and deodorized fresh and clean heat is circulated and used for cooking and surplus steam can be discharged outside the equipment.

Japan Patent Number JP2004194694

Inventor: Kajiwara Tokuji

Issued: Jul. 15, 2004

PROBLEM TO BE SOLVED: To provide a cooking device which exhausts steam smoothly and enables a precise heat cooking; SOLUTION: The cooking device is equipped with a cooking container 1 which cooks ingredients while supplying and exhausting the steam to and from a jacket 7 for the heat exchange, a supporting frame 3 supporting the cooking container 1 to tilt and rotate, a movable side coupling 29 attached to the side of the jacket 7 and communicated and connected with the inside of the jacket 7, and a fixed side coupling 31 attached to the side of the supporting frame 3 and communicated and connected with a source for supplying the steam. If the cooking container 1 is tilted and rotated from a cooking position, the movable side coupling 29 is detached from the fixed side coupling 31. If the tilting and rotating cooking container 1 is returned to the cooking position, the movable side coupling 29 is joined to the fixed side coupling 31, the movable side coupling 29 and the fixed side couplings 31, are communicated and connected. A weight sensor 18 for detecting the weight corresponding to the weight of the contents in the cooking container during the cooking is provided on the supporting frame 3.

While these cooking vessels may be suitable for the purposes for which they were designed, they would not be as suitable for the purposes of the present invention, as hereinafter described.

SUMMARY OF THE PRESENT INVENTION

A primary object of the present invention is to provide a cooking apparatus having a polygonal shape with an exteriorly positioned pressurizable condensate jacket.

Another object of the present invention is to provide the cooking apparatus with a polygonal shaped cooking skillet comprising a bottom plate having walls depending therefrom.

Yet another object of the present invention is to provide the skillet with adjacent planar surfaces with three or more sides wherein a food article is cooked.

Still yet another object of the present invention is to provide a pressurizable condensate jacket exteriorly covering one or more of the receptacle surfaces.

Another object of the present invention is to provide pin-like anchor fasteners fixed between the polygonal cooking receptacle and pressurizable condensate jacket.

Yet another object of the present invention is to provide the condensate jacket with a plurality of mating pin apertures whereby said jacket is mounted on and fixed to the anchor fasteners.

Still yet another object of the present invention is to provide a pressurizable condensate jacket having an interiorly positioned heat source.

Another object of the present invention is to provide a cooking apparatus having an optional condensate reservoir in fluid communication with the pressurizable condensate jacket.

Yet another object of the present invention is to provide a cooking apparatus wherein said reservoir incorporates an internal heat source.

Still yet another object of the present invention is to provide a cooking receptacle wherein said reservoir has an external heat source.

Another object of the present invention is to provide a heat source including internal and/or external electrical heating elements and external gas fired elements.

Additional objects of the present invention will appear as the description proceeds.

The present invention overcomes the shortcomings of the prior art by providing a cooking apparatus having a polygonal skillet comprising a bottom plate with depending walls and an exteriorly mounted sealed jacket spaced away in communication with a heat source for heating a condensate contained within the jacket to a vapor that will circulate around the substantially planar surfaces of the skillet confined by the jacket with the jacket positioned to form a condensate return slope. The jacket and skillet have a plurality of anchoring fasteners extending therebetween providing a cooking apparatus having an enclosure capable of 400 psi, which is not in the prior art that consist substantially of radial cross section vessels of lesser pressure capability.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
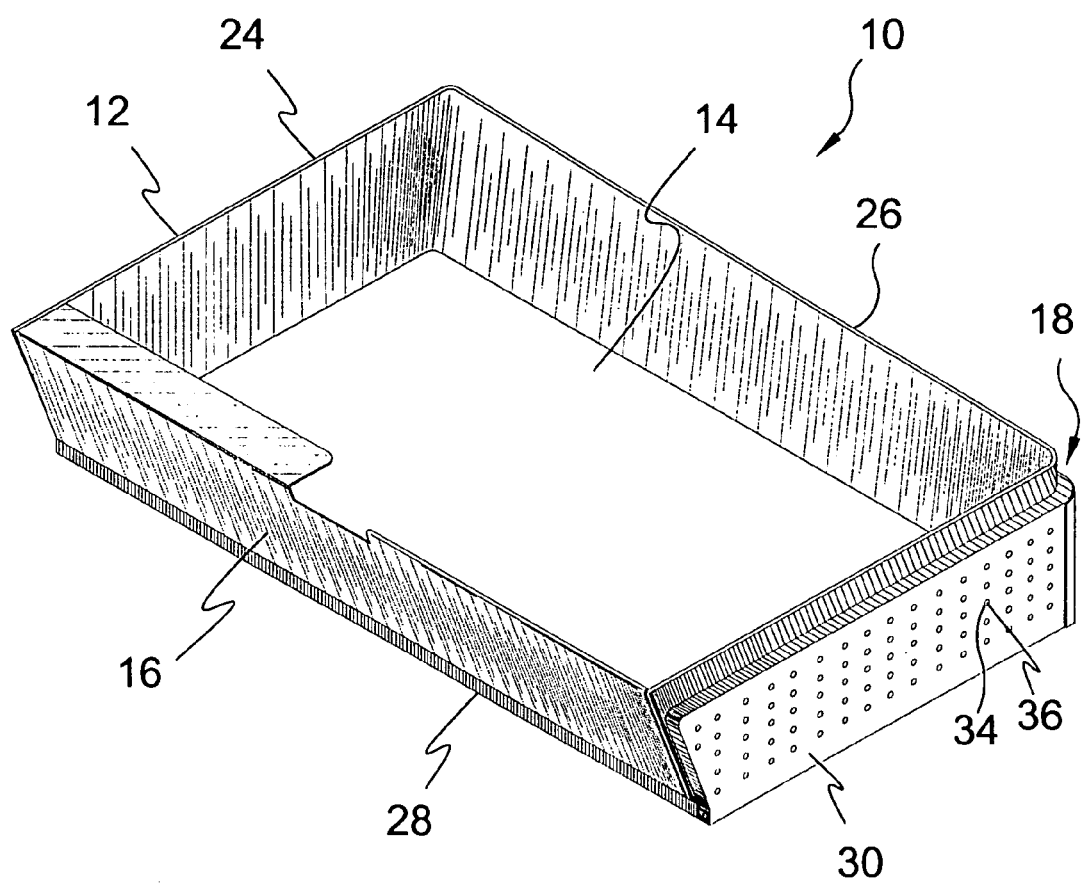
FIG. 1 is an illustrative view of the cooking apparatus of the present invention.

Turning now descriptively to the drawings, in which similar reference characters denote similar elements throughout the several views, the figures illustrate the Cooking Apparatus with Pressurizable Steam Jacket of the present invention. With regard to the reference numerals used, the following numbering is used throughout the various drawing figures.

10 Cooking Apparatus with Pressurizable Steam Jacket of the present invention
12 skillet
14 bottom plate of 12
16 angled front wall of 12
18 sectional steam circulation jacket assembly
20 bottom of 12
22 right wall of 12
24 left wall of 12
26 rear wall of 12
28 base plate of 18
30 wraparound section of 18
32 side section of 18
34 aperture of 18
36 jacket pin of 12
38 flange of 18
40 jacket cavity
42 steam
44 optional reservoir
46 internal heat source
48 gas version heat burner
50 electronic heating element
52 condensate
54 water
56 jacket tilt
60 condensate slope angle
62 alternate steam circulation jacket
64 stamped riser
66 interlocking perforated hanger

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the cooking apparatus of the present invention 10. The present invention is a polygonal cooking skillet 12 having a corresponding polygonal sectional steam jacket 18 comprising a bottom plate 14 with depending side 22,24 and rear 26 walls with a front wall 16 depending angularly outward from said bottom 14. A sectional sealed jacket assembly 18 is exteriorly mounted in spaced away relation with the skillet 12 and in communication with a heat source for heating a condensate contained within the jacket assembly 18 to a vapor that will circulate around the substantially planar surfaces of the skillet 12 confined by the jacket assembly 18 which is positioned to form a condensate return slope. The jacket assembly 18 has a plurality of apertures 34 for receiving jacket pins 36 projecting from the skillet 12 extending therebetween providing a cooking apparatus having an enclosure capable of 400 psi, which is not in the prior art that consist substantially of radial cross section vessels of lesser pressure capability.

Figure 2:
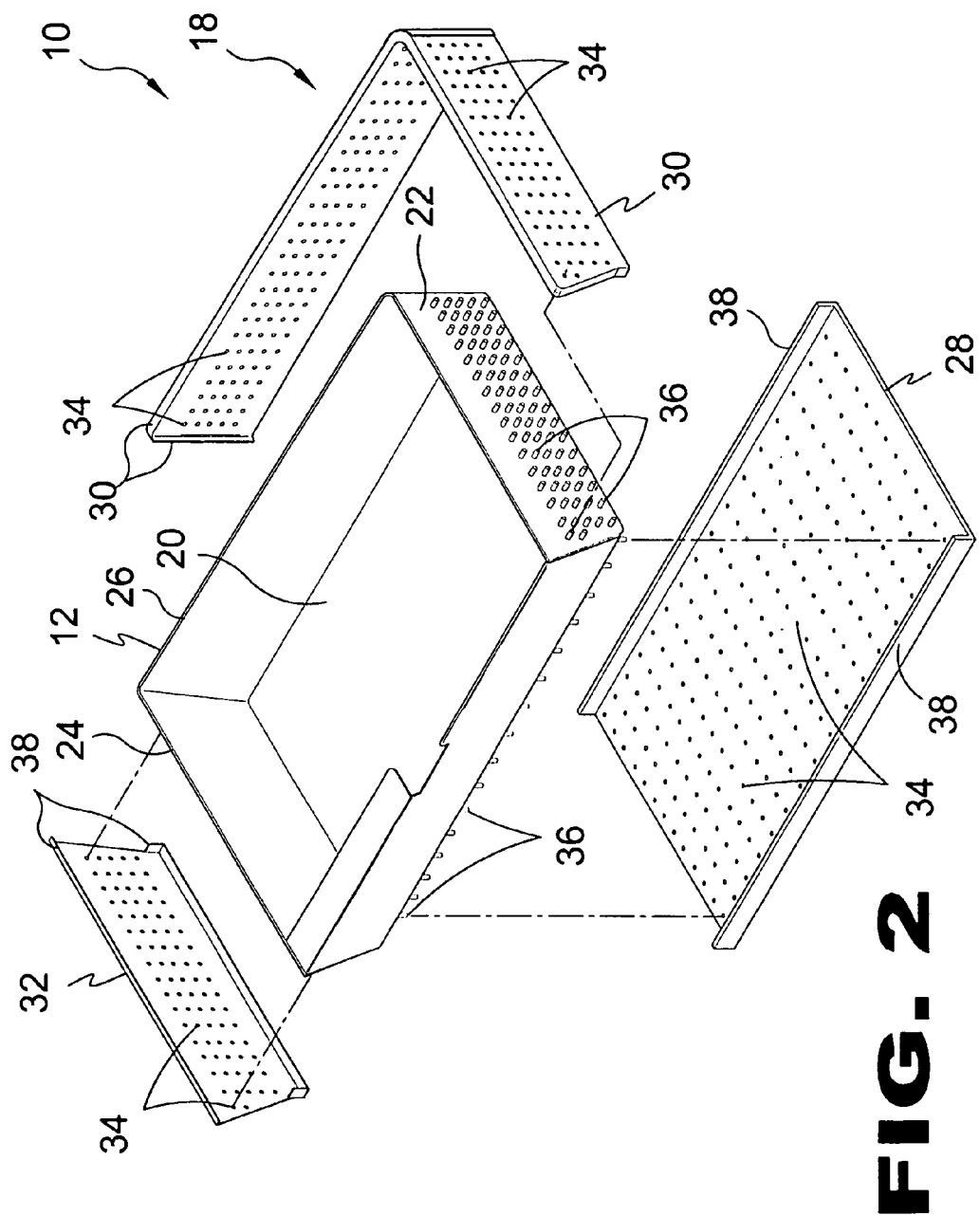
FIG. 2 is an exploded view of the present invention.

FIG. 2 is an exploded view of the present invention 10. The present invention 10 is a cooking apparatus having a polygonal skillet 12 having a bottom plate 14 with depending walls extending upwards therefrom. A plurality of jacket pins 36 project exteriorly from the bottom 14, the left wall 24, the right wall 22 and the rear wall 26 thereof. The sections of steam jacket assembly 18 have a plurality of apertures 34 corresponding with the jacket pins 18 of the skillet 12 for engagement therewith. Shown is a jacket assembly 18 comprising a base plate 28, a left side section 24 and a wraparound section 30 that mates with the right wall 22 and the rear wall 26 of the skillet 12. Each section of the jacket assembly 18 includes flanges 38 extending interiorly therefrom to form a pressurized seal and to maintain a spaced apart relation between the skillet 12 and the jacket assembly 18 and establish a jacket cavity therebetween. A condensate contained within the jacket cavity is heated from a liquid to a vapor by a provided heat source.

Figure 3:
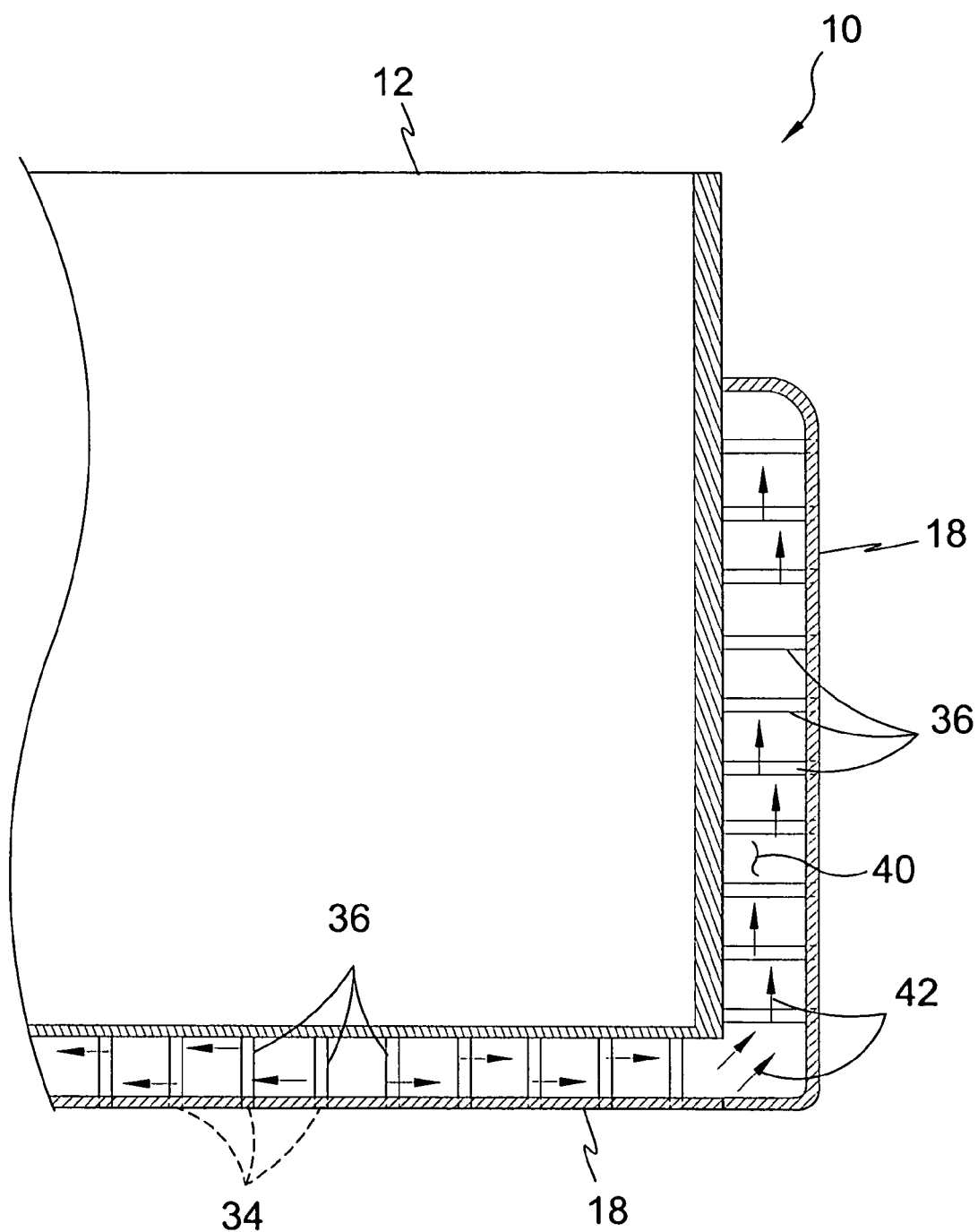
FIG. 3 is a sectional view of the present invention.

FIG. 3 is a sectional view of the present invention 10. Shown is a sectional view of the skillet 12 and jacket assembly 18 in spaced apart relation forming a jacket cavity 40 and in communication with a steam condensate source for circulating the resultant steam 42 within the cavity 42 thereby cooking the food article within the polygonal skillet 12. Also shown are the jacket pins 36 inserted into their corresponding apertures 34.

Figure 4:
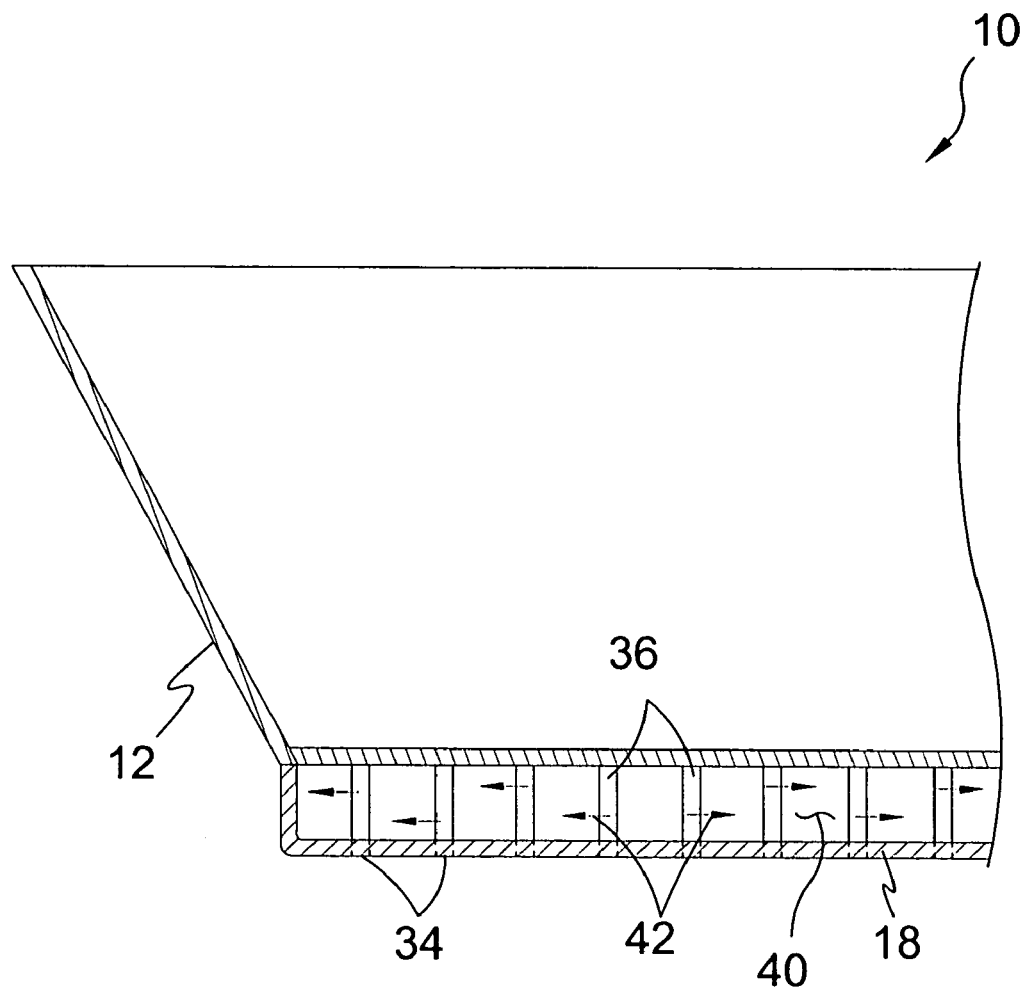
FIG. 4 is a front sectional view of the present invention.

FIG. 4 is a front sectional view of the present invention. Shown is a front sectional view of the skillet 12 and jacket assembly 18 in spaced apart relation forming a jacket cavity 40 and in communication with a steam condensate source for circulating the resultant steam 42 within the cavity 42 thereby cooking the food article within the polygonal skillet 12. Also shown are the jacket pins 36 inserted into their corresponding apertures 34 maintaining the spaced apart relation providing the jacket cavity 40 that is illustrated providing one side of the polygonal skillet 12 without a jacket section, which may by design cover one or more of the skillets 12 substantially planar surfaces that may also vary in the number of surfaces forming the skillet 12.

Figure 5:
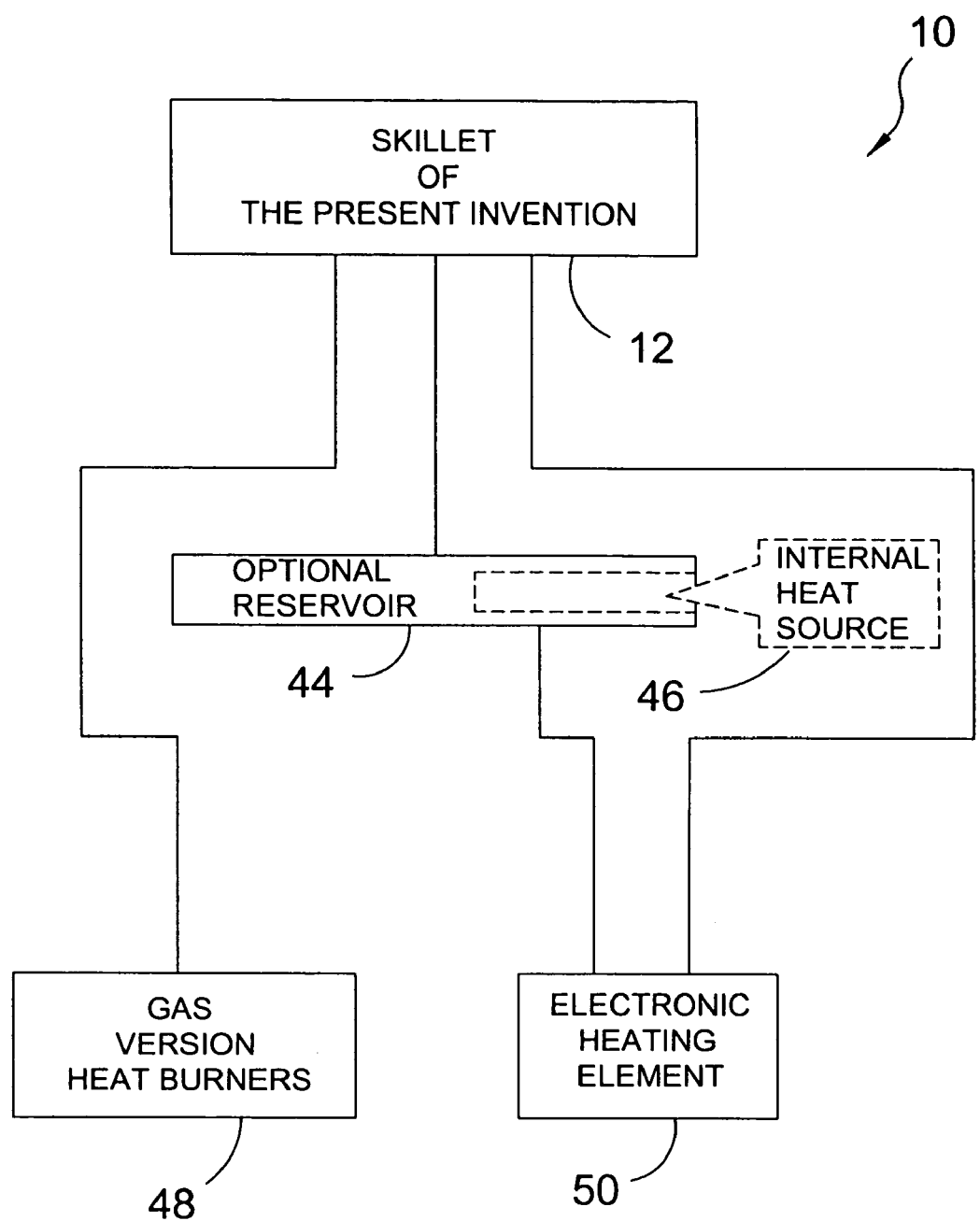
FIG. 5 is a logic diagram of the present invention.

FIG. 5 is a logic diagram of the present invention 10. The present invention 10 provides an optional reservoir 44 located at the bottom of the skillet 12 with an internal heat source 46, however, there is sufficient amount of room for condensate in the bottom of the unit accompanied by electronic heating elements 50 positioned within the reservoir 44, such as a flat bar heating element. A gas version of the device can have gas burners 48 mounted underneath the unit so that the heat from the burners 48 will be directed onto the bottom surface of the unit.

Figure 6:
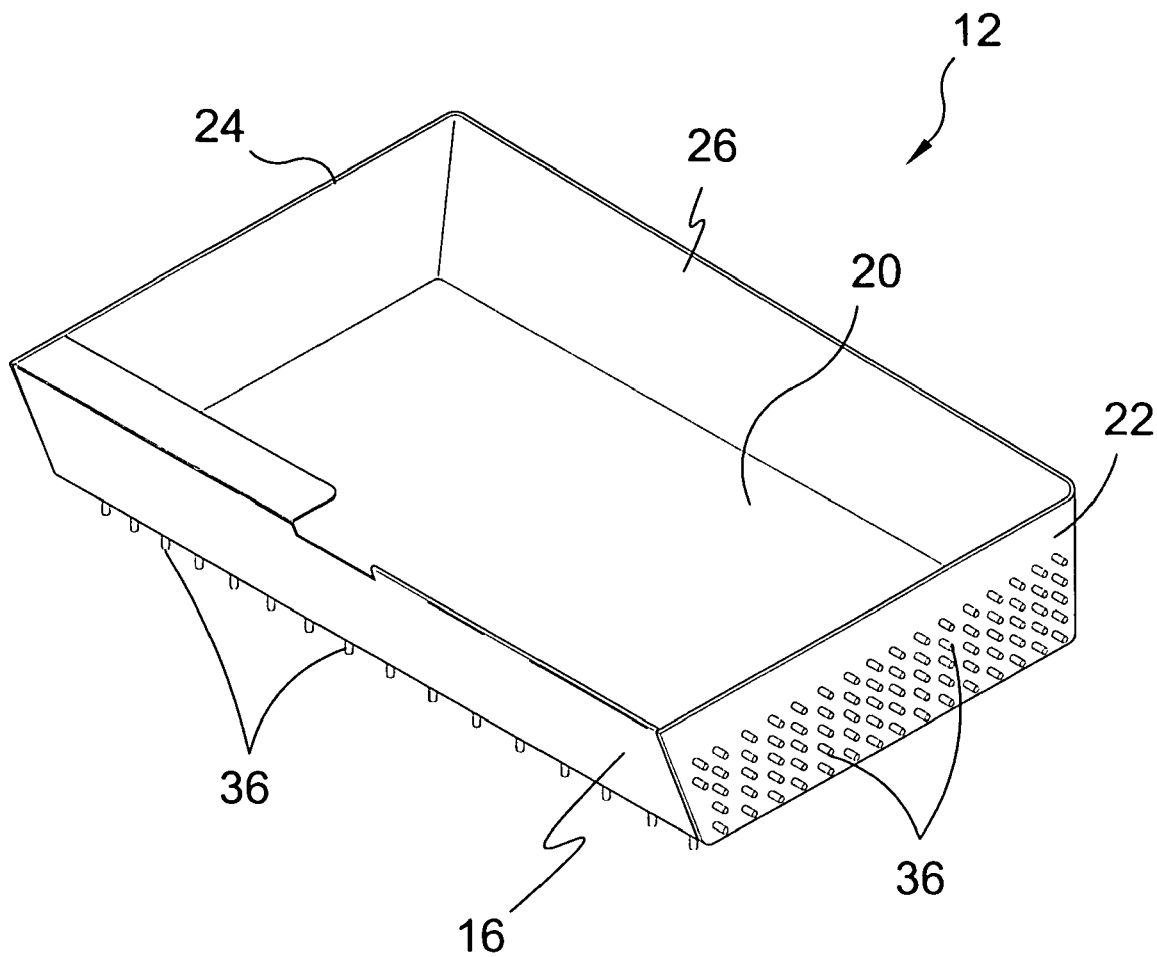
FIG. 6 is a perspective view of the polygonal receptacle.

FIG. 6 is a perspective view of the polygonal skillet 12. Shown is the skillet 12 having a bottom plate 20 with depending front 16, rear 26, left 24 and right 22 walls and a plurality of pins 36 depending from the exterior surface forming means for mounting an exteriorly mountable jacket.

Figure 7:
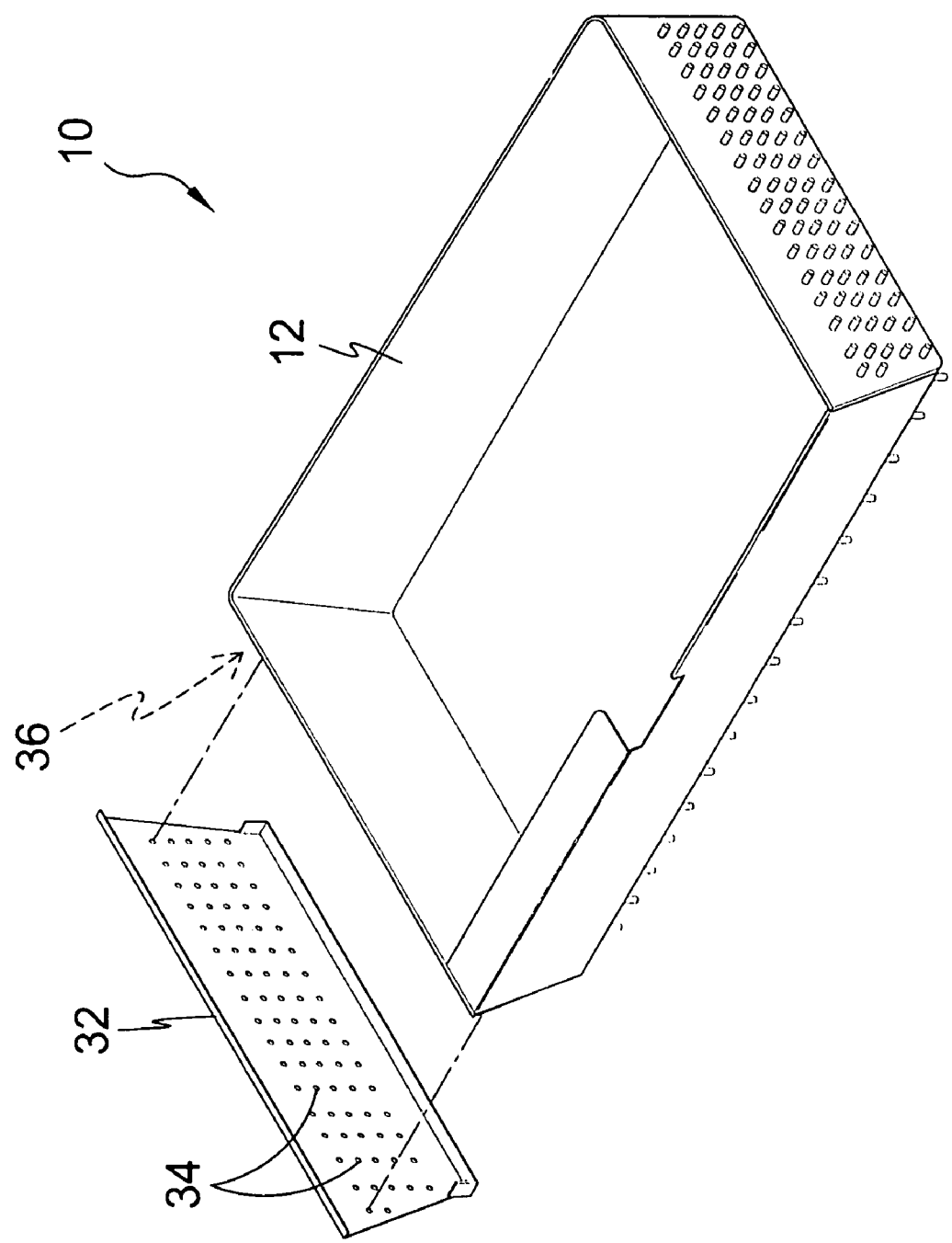
FIG. 7 is a perspective view of the present invention.

FIG. 7 is a perspective view of the present invention 10. Shown is the placement relationship between the skillet 12 having a plurality of jacket pins 36 that engage the apertures 34 of the left side section 32 of the jacket assembly.

Figure 8:
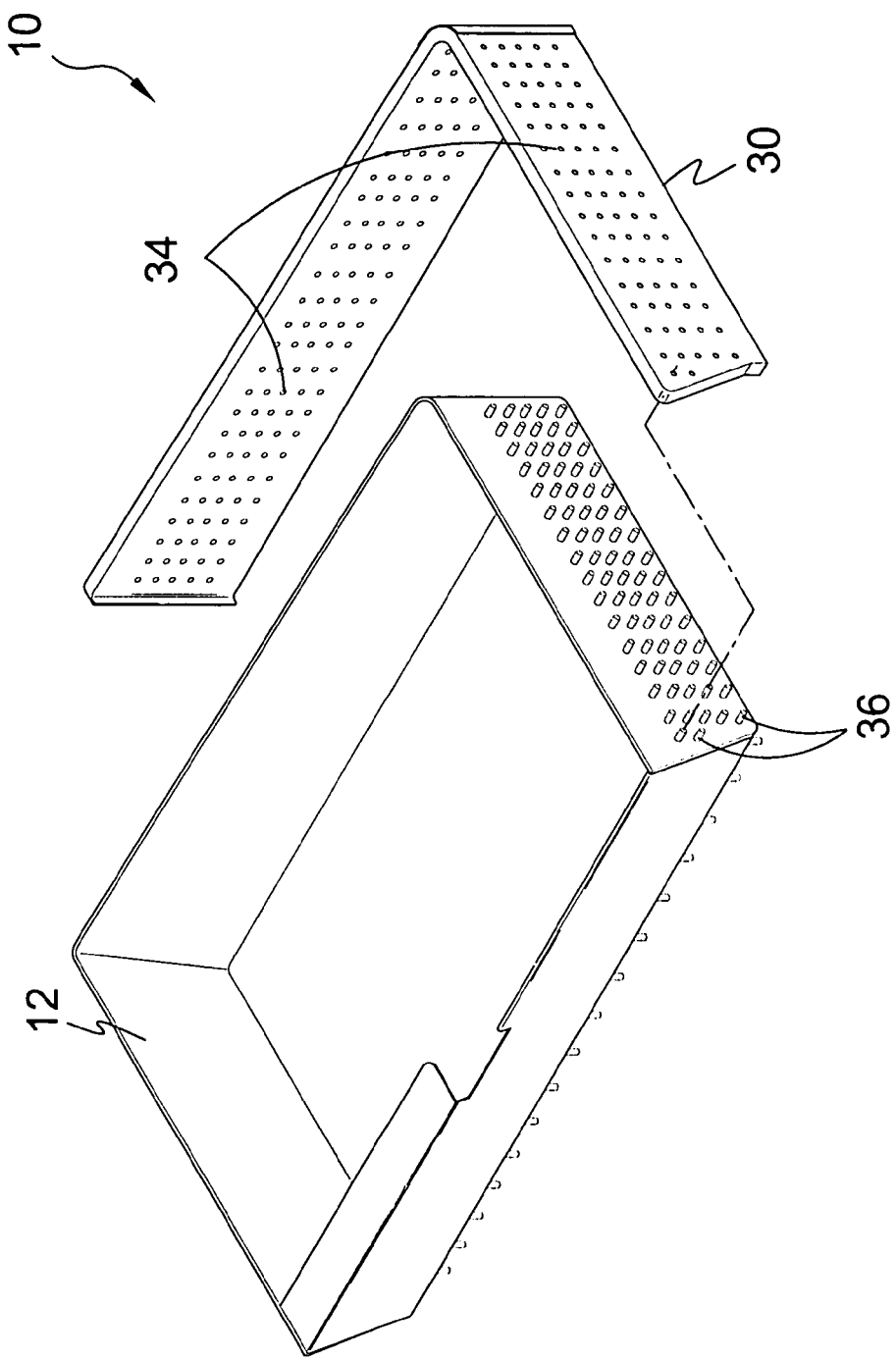
FIG. 8 is a perspective view of the present invention.

FIG. 8 is a perspective view of the present invention 10. Shown is the placement relationship between the skillet 12 having a plurality of jacket pins 36 that engage the apertures 34 of the wraparound section 30 of the jacket assembly.

Figure 9:
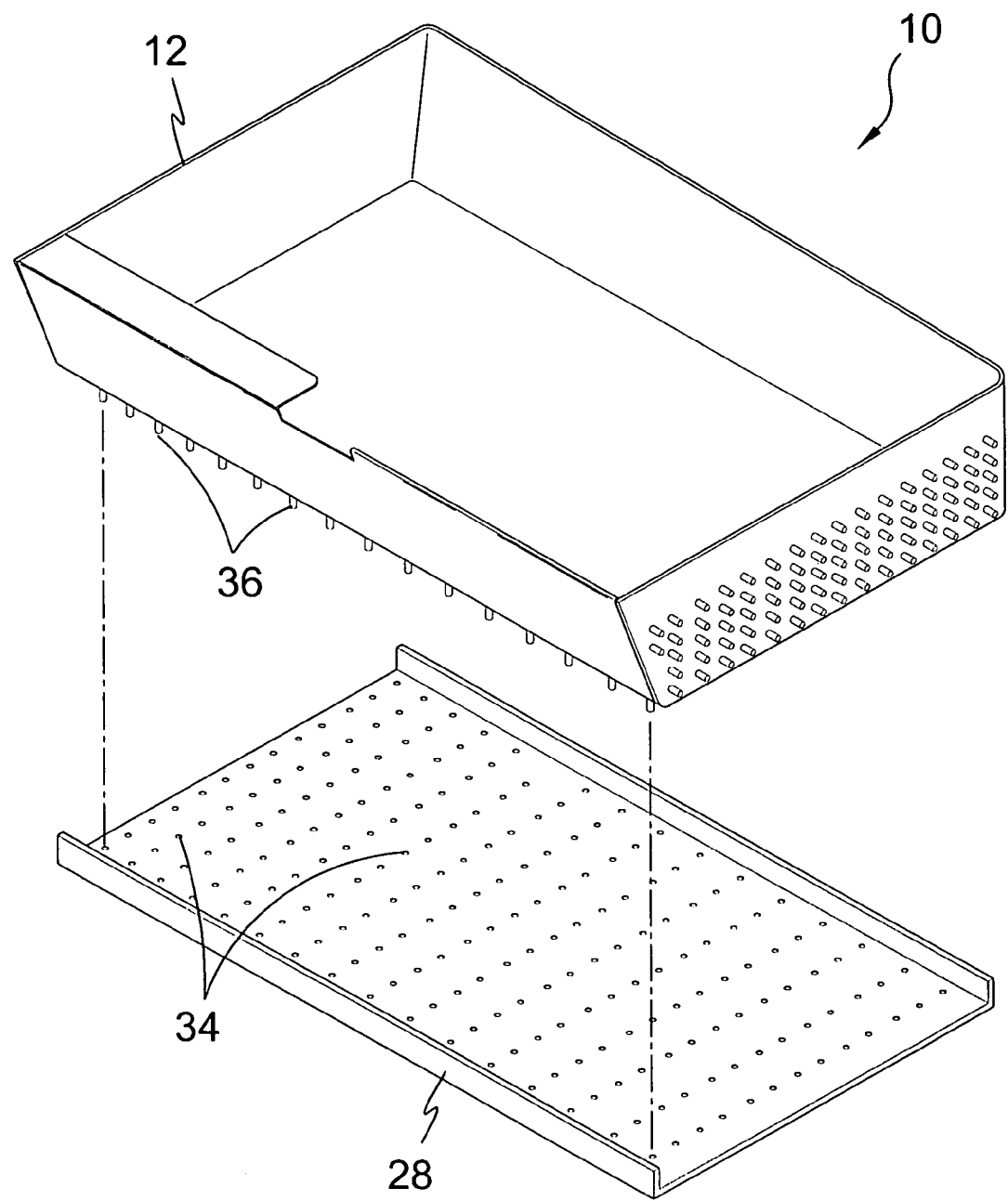
FIG. 9 is an exploded view of the present invention.

FIG. 9 is an exploded view of the present invention 10. Shown is the placement relationship between the skillet 12 having a plurality of jacket pins 36 that engage the apertures 34 of the base plate 28 of the jacket assembly. The present invention 10 provides sufficient room for condensate within the jacket and mounting electronic heating elements within the condensate reservoir, such as a flat bar heating element. Gas sources can also be positioned on the bottom of the unit as a heat source.

Figure 10:
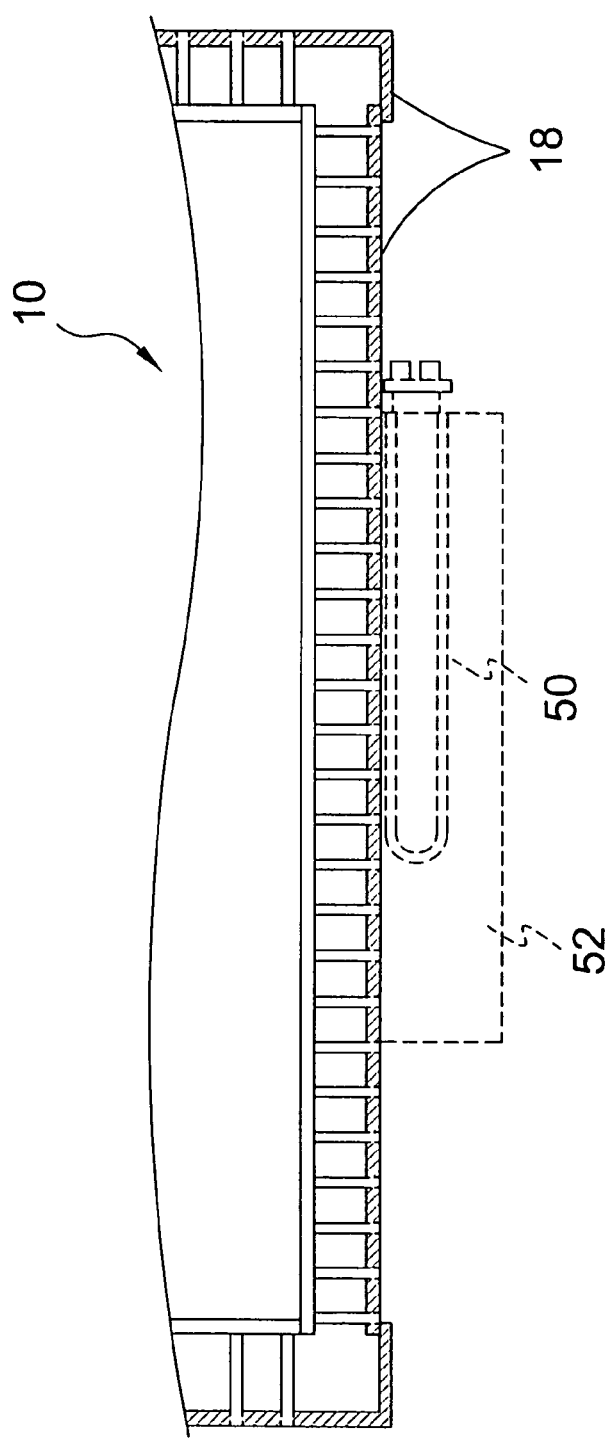
FIG. 10 is a sectional view of the present invention.

FIG. 10 is a sectional view of the present invention 10. The present invention 10 provides for condensate 52 in the bottom of the unit with electronic heating elements mounted therein, as well as providing a reservoir with a heat source 46 mounted therein having conduit extending between the reservoir and the condensate jacket 18.

Figure 11:
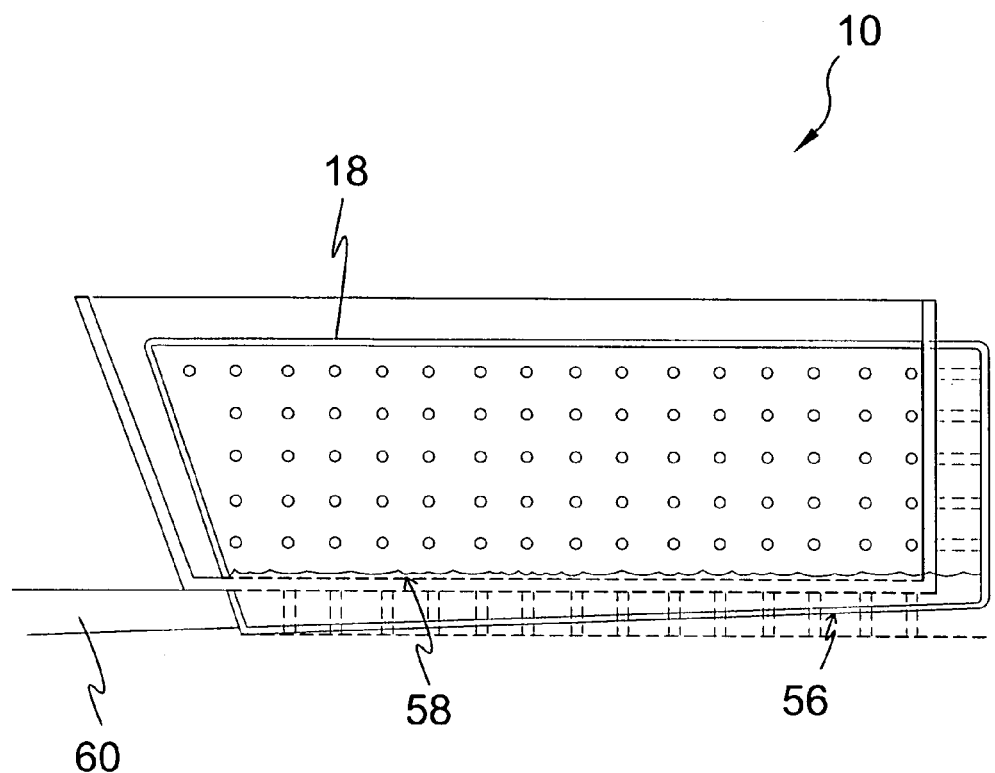
FIG. 11 is a side view of the present invention.

FIG. 11 is a side view of the present invention 18. The present invention 10 provides efficient amount of room for water 54 in the bottom of the unit. The side jackets are tilted to allow the return of condensation back to the reservoir as illustrated by the jacket tilt 56 the condensate line 58 and the condensate slope angle 60.

Figure 12:
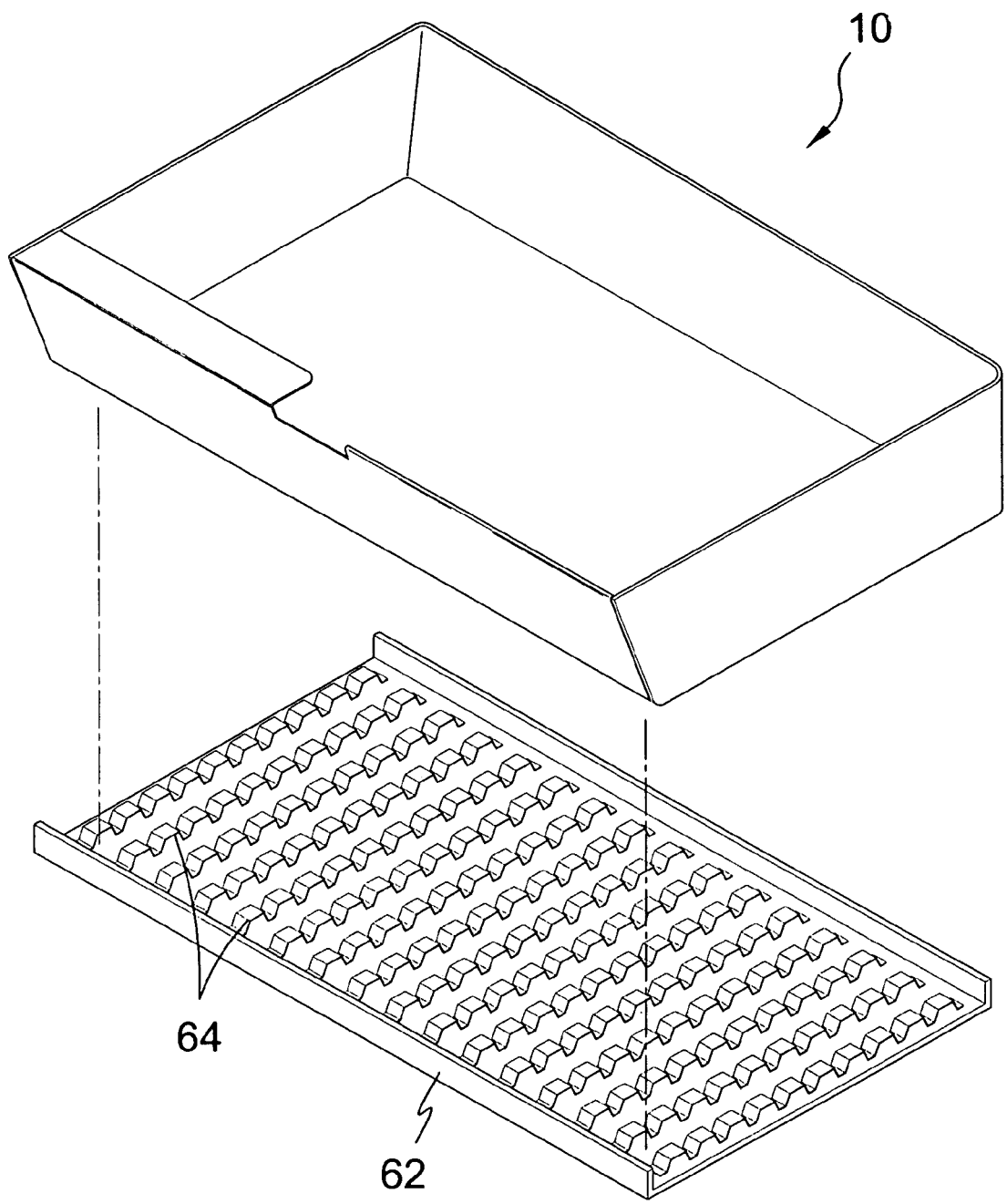
FIG. 12 is an exploded view of the present invention's alternate construction.

FIG. 12 is an exploded view of the present invention's 10 alternate construction. The present invention 10 provides another means of construction for gaining sufficient room for condensate within the jacket and mounting electronic heating elements within the condensate reservoir. In lieu of pins, the alternate steam circulation jacket 62 contains a series of stamped risers 64 that are affixed to the steam jacket 62 by spot welds or other means.

Figure 13:
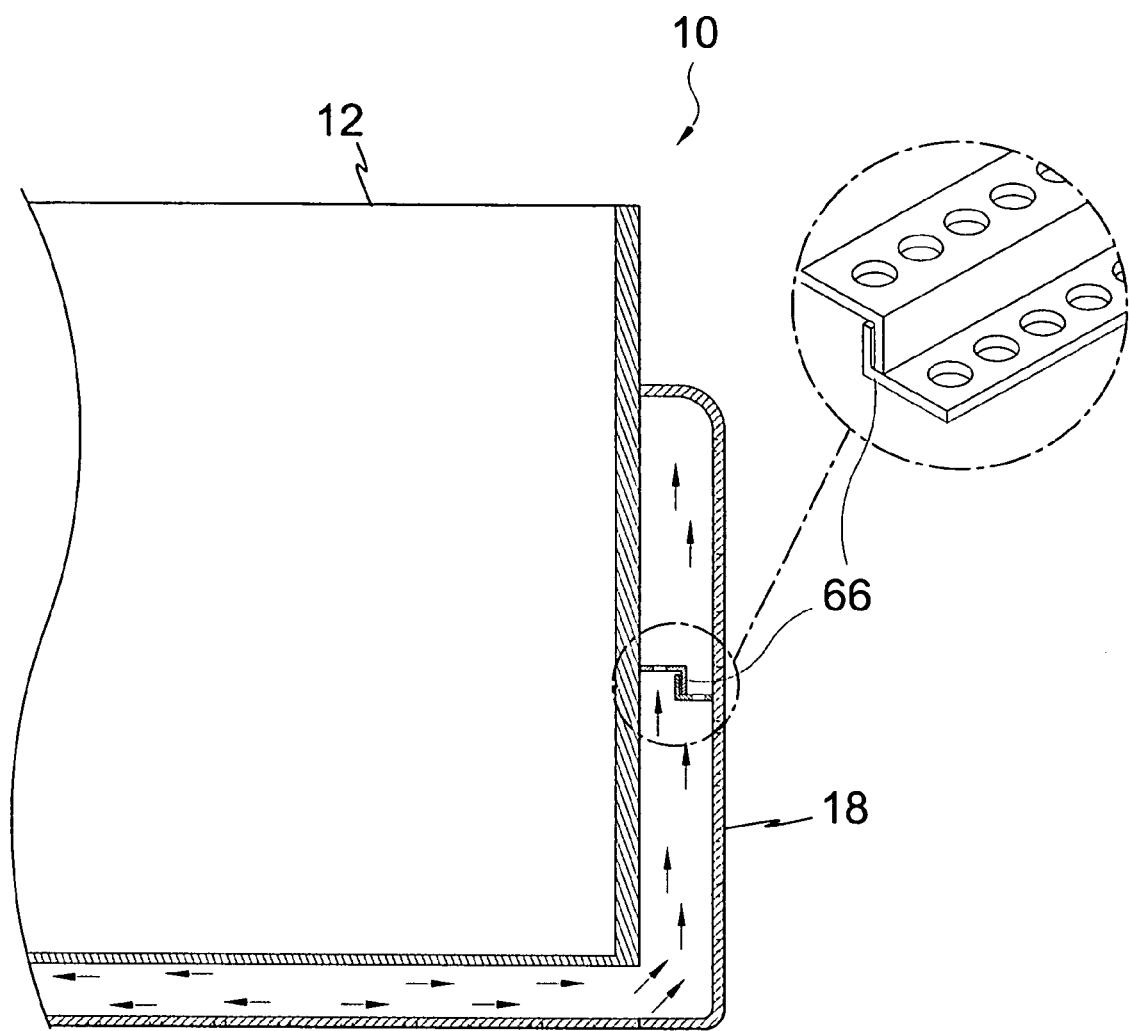
FIG. 13 is a sectional detail view of the present invention's alternate construction.

FIG. 13 is a sectional detail view of the present invention's 10 alternate construction. The present invention 10 provides yet another means of construction for gaining sufficient room for condensate within the jacket and mounting electronic heating elements within the condensate reservoir. In lieu of pins, the steam jacket 18 contains interlocking perforated hangers 66 affixed on each side wall to both the steam jacket 18 and skillet 12.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

What is claimed is new and desired to be protected by Letters Patent is set forth in the appended claims:

1. A polygonal cooking apparatus with a pressurizable condensate jacket comprising:
   a) a polygonal skillet having a bottom plate, at least three sides and an open top;
   b) a steam circulation jacket assembly exteriorly enveloping at least half of said skillet sides and bottom portion thereof in a spaced-apart relation to form a sealed jacket cavity therebetween;
   c) means for mounting said steam circulation jacket on said skillet;
   d) a condensate contained within said jacket cavity;
   e) a heat source in communication with said steam circulation jacket for heating said condensate contained within said jacket cavity to a vapor that circulates around the substantially planar surfaces of said skillet confined therein by said steam circulation jacket; and
   f) said steam circulation jacket mounting means comprises a plurality of jacket pins projecting from the outer surfaces of said skillet on which said steam circulation jacket sections are to be employed and mating apertures for each said jacket pin disposed in the walls of the corresponding steam circulation jacket sections wherein said jacket pins are inserted into their corresponding apertures during assembly.

2. The polygonal cooking apparatus with a pressurizable condensate jacket recited in claim 1, wherein each section of said steam circulation jacket includes a plurality of flanges with each said flange projecting inwardly from selected edges thereof to determine and maintain the spaced-apart relation between the outer surfaces of said skillet and the respective inner walls of said steam circulation jacket thereby effectively defining said jacket cavity.

3. The polygonal cooking apparatus with a pressurizable condensate jacket recited in claim 2, wherein said flanges of said steam circulation jacket assembly sections further serve to overlap adjacent sections thereby working conjunctively with said jacket pins and apertures to prevent displacement of said steam circulation jacket assembly when an internal pressure is applied to said jacket cavity.

4. The polygonal cooking apparatus with a pressurizable condensate jacket recited in claim 3, wherein said jacket cavity is capable of receiving an internal psi of approximately, but not limited to, 400 psi.

5. The polygonal cooking apparatus with a pressurizable condensate jacket recited in claim 4, wherein said steam circulation jacket includes at least one angled wraparound section to engage at least two of the adjacent planar outer surfaces of said skillet.

6. The polygonal cooking apparatus with a pressurizable condensate jacket recited in claim 5, wherein said condensate is vaporized when heated by said heat source and the resultant pressurized steam that circulates through said jacket cavity transfers heat to said skillet to cook food articles that are placed therein.

7. The polygonal cooking apparatus with a pressurizable condensate jacket recited in claim 6, further including a reservoir in communication with said jacket cavity via a conduit.

8. The polygonal cooking apparatus with a pressurizable condensate jacket recited in claim 7, wherein said heat source is internally disposed within said reservoir.

9. The polygonal cooking apparatus with a pressurizable condensate jacket recited in claim 8, wherein said heat source is a flat bar heating element.

10. The polygonal cooking apparatus with a pressurizable condensate jacket recited in claim 9, wherein said a sidewall of said steam circulation jacket is angularly disposed accordingly to encourage the return of said condensation to said reservoir.

\* \* \* \* \*